(12) United States Patent
Liu et al.

(10) Patent No.: US 8,891,389 B2
(45) Date of Patent: Nov. 18, 2014

(54) METHODS AND APPARATUSES FOR DETECTING TRANSMISSION COLLISION AND/OR ALLEVIATING TRANSMISSION COLLISION

(75) Inventors: Hsuan-Yu Liu, Hsinchu County (TW); Ho-Chi Huang, Hsinchu County (TW)

(73) Assignee: MediaTek Inc., Science-Based Industrial Park, Hsin-Chu (TW)

( * ) Notice: Subject to any disclaimer, the term of this patent is extended or adjusted under 35 U.S.C. 154(b) by 466 days.

(21) Appl. No.: 13/275,335

(22) Filed: Oct. 18, 2011

(65) Prior Publication Data

US 2013/0094375 A1 Apr. 18, 2013

(51) Int. Cl.
| | | |
|---|---|---|
| *H04L 12/26* | (2006.01) | |
| *H04W 74/08* | (2009.01) | |
| *H04L 1/18* | (2006.01) | |

(52) U.S. Cl.
CPC .............. *H04W 74/0841* (2013.01); *H04L 1/18* (2013.01)
USPC .......................................................... 370/252

(58) Field of Classification Search
None
See application file for complete search history.

(56) References Cited

U.S. PATENT DOCUMENTS

| | | | | |
|---|---|---|---|---|
| 2005/0068979 A1* | 3/2005 | Boer et al. | ............. | 370/445 |
| 2005/0100040 A1* | 5/2005 | Guo et al. | ............. | 370/445 |
| 2005/0276276 A1* | 12/2005 | Davis | ............. | 370/447 |
| 2006/0192697 A1* | 8/2006 | Quick et al. | ............. | 341/60 |
| 2010/0080118 A1* | 4/2010 | Yamauchi | ............. | 370/221 |

* cited by examiner

*Primary Examiner* — Dang Ton
*Assistant Examiner* — Ronald H Davis
(74) *Attorney, Agent, or Firm* — Winston Hsu; Scott Margo

(57) ABSTRACT

A method for detecting a transmission collision between a first wireless communication terminal and a second wireless communication terminal includes the following steps: when one retry packet transmitted from the first wireless communication terminal is received by the second wireless communication terminal, checking if at least one transmission collision condition is met and accordingly generating a checking result; deriving statistic data from a plurality of checking results generated in response to a plurality of retry packets transmitted from the first wireless communication terminal; and detecting the transmission collision between the first wireless communication terminal and the second wireless communication terminal according to the statistic data.

20 Claims, 15 Drawing Sheets

METHODS AND APPARATUSES FOR DETECTING TRANSMISSION COLLISION AND/OR ALLEVIATING TRANSMISSION COLLISION

BACKGROUND

The disclosed embodiments of the present invention relate to dealing with transmission collision between two wireless communication terminals, and more particularly, to methods and apparatuses for detecting transmission collision and/or alleviating transmission collision.

Regarding a half-duplex communication system such as a WiFi system, a wireless communication terminal is allowed to perform only one of a transmission (TX) task and a reception (RX) task. Therefore, when two wireless communication terminals linked to each other are operated under the TX mode to transmit packets to each other, a TX collision happens. As none of the wireless communication terminals is operated under an RX mode, one of the wireless communication terminals fails to receive packets transmitted from the other of the wireless communication terminals. Thus, both of the wireless communication terminals have to re-transmit the packets (i.e., transmit retry packets), resulting in degradation of the system throughput.

Taking the WiFi system for example, an access point (AP) and a station (STA) are initially synchronized in time domain. Thus, time points separated by a fixed period (e.g., a 9 us period) would be used as TX start points of the AP and STA. One conventional means for avoiding the undesired TX collision is to use the clear channel assessment (CCA) mechanism. In general, the CCA mechanism is only capable of detecting an on-going packet transmission. However, as both of the AP and STA may leave the RX mode and enter the TX mode at the same time point due to the aforementioned TX timing synchronization, the CCA mechanism of either of the AP and STA is disabled in the beginning of the packet transmission. In other words, in a case where both of the AP and STA transmit packets at the same time, the CCA mechanism is disabled and fails to detect the occurrence of TX collision.

Thus, there is a need for an innovative design for detecting the TX collision and/or alleviating/avoiding the TX collision.

SUMMARY

In accordance with exemplary embodiments of the present invention, methods and apparatuses for detecting transmission collision and/or alleviating transmission collision are proposed to solve the above-mentioned problem.

According to a first aspect of the present invention, an exemplary method for detecting a transmission collision between a first wireless communication terminal and a second wireless communication terminal is disclosed. The exemplary method includes: when one retry packet transmitted from the first wireless communication terminal is received by the second wireless communication terminal, checking if at least one transmission collision condition is met and accordingly generating a checking result; deriving statistic data from a plurality of checking results generated in response to a plurality of retry packets transmitted from the first wireless communication terminal; and detecting the transmission collision between the first wireless communication terminal and the second wireless communication terminal according to the statistic data.

According to a second aspect of the present invention, an exemplary method for detecting a transmission collision between a first wireless communication terminal and a second wireless communication terminal is disclosed. The exemplary method includes: setting transmission timing of the second wireless communication terminal by different values including at least a first value and a second value; when the transmission timing of the second wireless communication terminal is set by the first value, obtaining a first count value by counting a number of retry packets included in first packets transmitted from the first wireless communication terminal; when the transmission timing of the second wireless communication terminal is set by the second value, obtaining a second count value by counting a number of retry packets included in second packets transmitted from the first wireless communication terminal; and detecting the transmission collision between the first wireless communication terminal and the second wireless communication terminal according to at least the first count value and the second count value.

According to a third aspect of the present invention, an exemplary method for alleviating a transmission collision between a first wireless communication terminal and a second wireless communication terminal is disclosed. The exemplary method includes: detecting the transmission collision between the first wireless communication terminal and the second wireless communication terminal, and accordingly generating a detection result; and adjusting transmission timing of the second wireless communication terminal according to the detection result.

According to a fourth aspect of the present invention, an exemplary transmission collision detecting apparatus for detecting a transmission collision between a first wireless communication terminal and a second wireless communication terminal is disclosed. The exemplary transmission collision detecting apparatus includes a checking circuit, a computing circuit, and a detecting circuit. The checking circuit is arranged for checking if at least one transmission collision condition is met and accordingly generating a checking result when one retry packet transmitted from the first wireless communication terminal is received by the second wireless communication terminal. The computing circuit is coupled to the checking circuit, and arranged for deriving statistic data from a plurality of checking results generated in response to a plurality of retry packets transmitted from the first wireless communication terminal. The detecting circuit is coupled to the computing circuit, and arranged for detecting the transmission collision between the first wireless communication terminal and the second wireless communication terminal according to the statistic data.

According to a fifth aspect of the present invention, an exemplary transmission collision detecting apparatus for detecting a transmission collision between a first wireless communication terminal and a second wireless communication terminal is disclosed. The exemplary transmission collision detecting apparatus includes a setting circuit, a counting circuit, and a detecting circuit. The setting circuit is arranged for setting transmission timing of the second wireless communication terminal by different values including at least a first value and a second value. The counting circuit is arranged for obtaining a first count value by counting a number of retry packets included in first packets transmitted from the first wireless communication terminal when the transmission timing of the second wireless communication terminal is set by the first value; and obtaining a second count value by counting a number of retry packets included in second packets transmitted from the first wireless communication terminal when the transmission timing of the second wireless communication terminal is set by the second value. The detecting circuit is coupled to the counting circuit, and arranged for detecting the transmission collision between the first wireless communication terminal and the second wireless communication terminal according to at least the first count value and the second count value.

According to a sixth aspect of the present invention, an exemplary apparatus for alleviating a transmission collision between a first wireless communication terminal and a second wireless communication terminal is disclosed. The apparatus includes a transmission collision detecting apparatus and a transmission timing adjusting apparatus. The transmission collision detecting apparatus is arranged for detecting the transmission collision between the first wireless communication terminal and the second wireless communication terminal, and accordingly generating a detection result. The transmission timing adjusting apparatus is coupled to the transmission collision detecting apparatus, and arranged for adjusting transmission timing of the second wireless communication terminal according to the detection result.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "coupled" is intended to mean either an indirect or direct electrical connection. Accordingly, if one device is electrically connected to another device, that connection may be through a direct electrical connection, or through an indirect electrical connection via other devices and connections.

Figure 1:
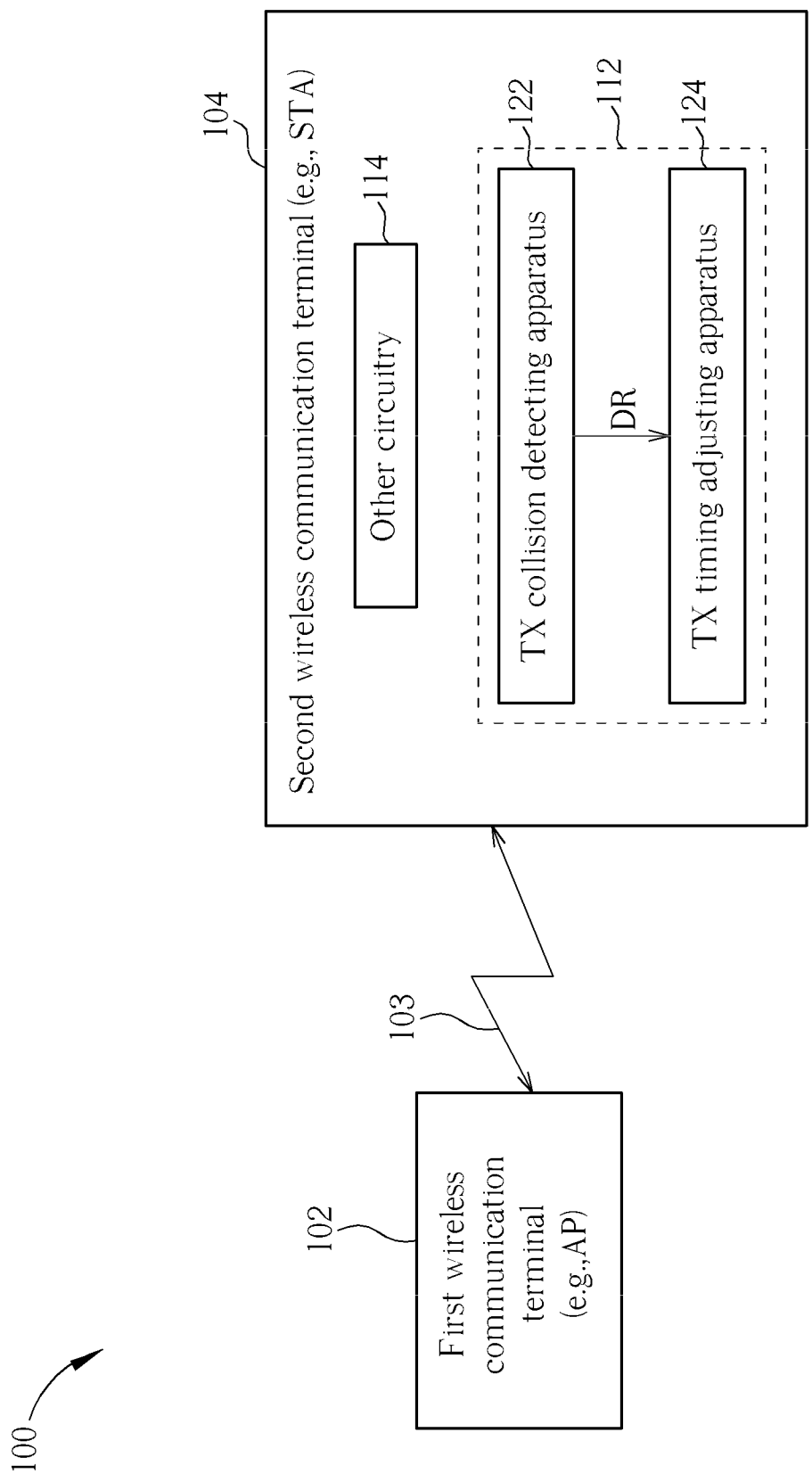
FIG. 1 is a diagram illustrating a communication system according to an exemplary embodiment of the present invention.

FIG. 1 is a diagram illustrating a communication system according to an exemplary embodiment of the present invention. By way of example, but not limitation, the communication system 100 may be a half-duplex communication system such as a WiFi system. The communication system 100 contains a plurality of communication terminals, including a first wireless communication terminal (e.g., an AP) 102 and a second wireless communication terminal 104 (e.g., an STA). Please note that only two wireless communication terminals are shown in FIG. 1 for simplicity and clarity. As shown in the figure, there is a link 103 established between the first wireless communication terminal 102 and the second wireless communication terminal 104. Thus, the first wireless communication terminal 102 is allowed to communicate with (i.e., transmit packets to/receive packets from) the second wireless communication terminal 104 through the established link 103.

The second wireless communication terminal 104 includes an apparatus 112 for alleviating the undesired TX collision between the first wireless communication terminal 102 and the second wireless communication terminal 104, and further includes other circuitry 114 needed for realizing the designated transmission/reception functionality of the second wireless communication terminal 104. As the present invention focuses on dealing with the TX collision, further description of other circuitry 114 is omitted here for brevity. In this exemplary embodiment, the apparatus 112 includes a TX collision detecting apparatus 122 and a TX timing adjusting apparatus 124. The TX collision detecting apparatus 122 is arranged for detecting the TX collision between the first wireless communication terminal 102 and the second wireless communication terminal 104, and accordingly generating a detection result DR. The TX timing adjusting apparatus 124 is coupled to the TX collision detecting apparatus 122, and arranged for adjusting TX timing of the second wireless communication terminal 104 according to the detection result DR. For example, the TX timing adjusting apparatus 124 may refer to the detection result DR to adjust the TX timing of the second wireless communication terminal 104 by advancing/delaying the TX timing.

Figure 2:
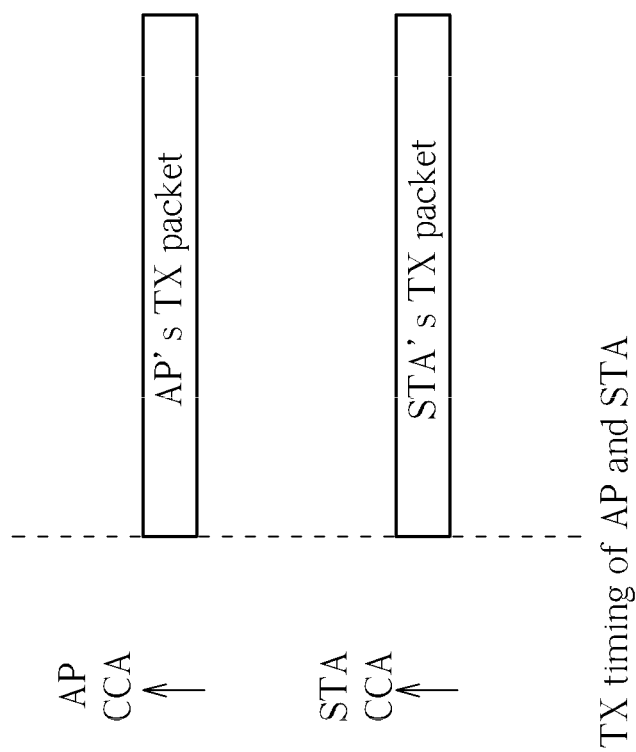
FIG. 2 is a diagram illustrating a condition where the first wireless communication terminal and the second wireless communication terminal start transmitting packets at the same transmission timing.
Figure 3:
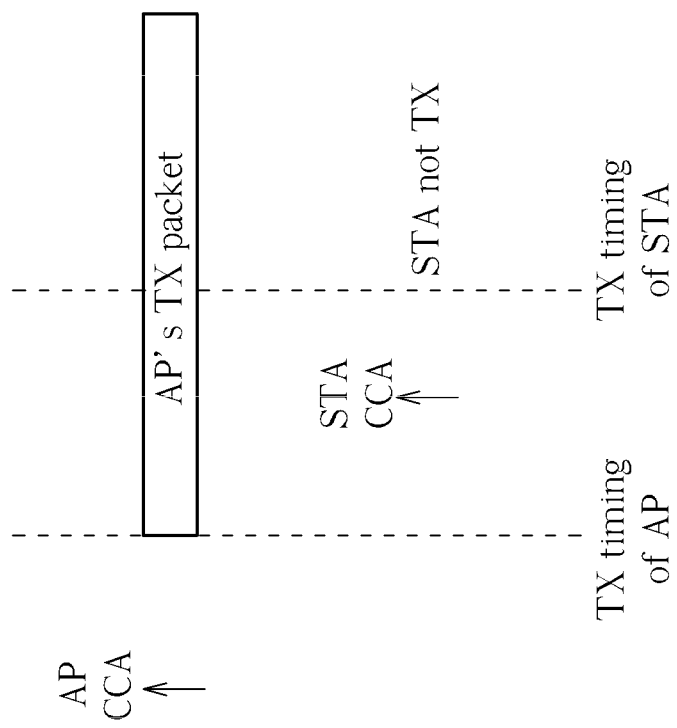
FIG. 3 is a diagram illustrating a condition where the transmission timing of the second wireless communication terminal is intentionally delayed to therefore lag behind the transmission timing of the first wireless communication terminal.
Figure 4:
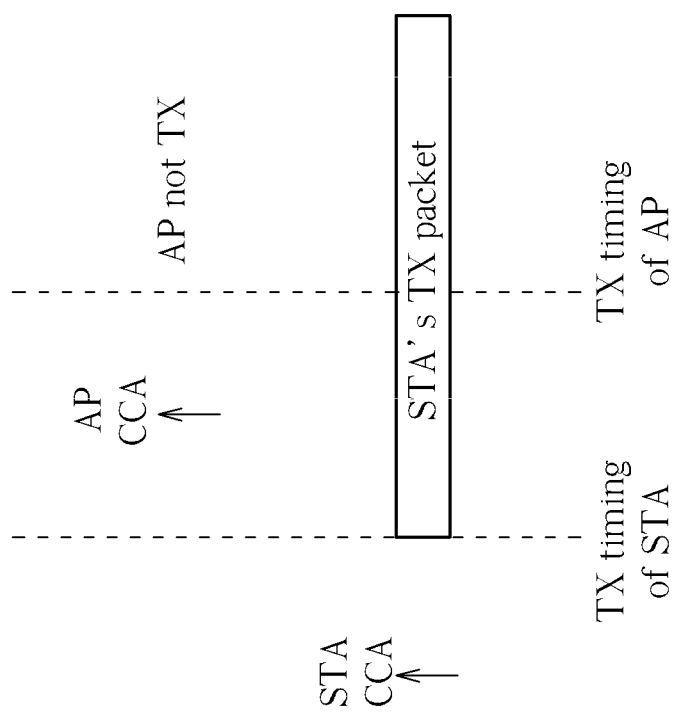
FIG. 4 is a diagram illustrating a condition where the transmission timing of the second wireless communication terminal is intentionally advanced to therefore lead the transmission timing of the first wireless communication terminal.

Please refer to FIG. 2, FIG. 3, and FIG. 4. FIG. 2 is a diagram illustrating a condition where the first wireless communication terminal (e.g., AP) 102 and the second wireless communication terminal (e.g., STA) 104 start transmitting packets at the same TX timing. FIG. 3 is a diagram illustrating a condition where the TX timing of the second wireless communication terminal (e.g., STA) 104 is intentionally delayed to therefore lag behind the TX timing of the first wireless communication terminal (e.g., AP) 102. FIG. 4 is a diagram illustrating a condition where the TX timing of the second wireless communication terminal (e.g., STA) 104 is intentionally advanced to therefore lead the TX timing of the first wireless communication terminal (e.g., AP) 102. As shown in FIG. 2, the TX timing of the first wireless communication terminal 102 is aligned with that of the second wireless communication terminal 104. In a case where the conventional CCA mechanisms of the first wireless communication terminal 102 and the second wireless communication terminal 104 are employed for TX collision detection, no TX collision is found due to the fact that both of the first wireless communication terminal 102 and the second wireless communication terminal 104 stay in the RX mode. Specifically, both of the first wireless communication terminal 102 and the second wireless communication terminal 104 enter the TX mode and start transmitting packets at the same TX timing. In contrast to the conventional design, the present invention proposes an innovative TX collision detection mechanism for solving the problem encountered by the conventional design. The proposed TX collision detection mechanism will be detailed later. Thus, when the TX collision detecting apparatus 122 employs the proposed TX collision detection mechanism, the TX collision between the first wireless communication terminal 102 and the second wireless communication terminal 104 may be identified and then indicated by the detection result DR generated to the TX timing adjusting apparatus 124.

When receiving the detection result DR indicative of occurrence of the undesired TX collision, the TX timing adjusting apparatus 124 may delay the TX timing of the second wireless communication terminal 104, as shown in FIG. 3. In this way, the conventional CCA mechanism employed by the second wireless communication terminal 104 successfully detects the on-going packet transmission of the first wireless communication terminal 102 due to the intentionally delayed TX timing of the second wireless communication terminal 104. Thus, the second wireless communication terminal 104 does not enter the TX mode at the original TX timing. Instead, the second wireless communication terminal 104 is controlled to start transmitting a packet to the first wireless communication terminal 102 at the intentionally delayed TX timing, thereby alleviating/avoiding the TX collision.

When receiving the detection result DR indicative of occurrence of the undesired TX collision, the TX timing adjusting apparatus 124 may advance the TX timing of the second wireless communication terminal 104, as shown in FIG. 4. In this way, the conventional CCA mechanism employed by the first wireless communication terminal 102 successfully detects the on-going packet transmission of the second wireless communication terminal 104 due to the intentionally advanced TX timing of the second wireless communication terminal 104. Thus, the first wireless communication terminal 102 will not enter the TX mode and start transmitting a packet to the second wireless communication terminal 102 at the original TX timing, thereby alleviating/avoiding the TX collision.

To put it simply, making the TX timing of one wireless communication terminal non-synchronized with the TX timing of another wireless communication terminal upon detection of TX collision, the conventional CCA mechanism employed by one of the wireless communication terminals is allowed to successfully detect the on-going packet transmission of the other of the wireless communication terminals. In this way, the TX collision is avoided or alleviated, which improves the overall system throughput greatly.

As mentioned above, the TX collision detection mechanism proposed by the present invention is capable of detecting the TX collision generated due to synchronized TX timing of two wireless communication terminals. Please refer to FIG. 5, which is a block diagram illustrating one exemplary implementation of a TX collision detecting apparatus according to the present invention. The TX collision detecting apparatus 122 shown in FIG. 1 may be implemented by the TX collision detecting apparatus 500 for detecting TX collision between the first wireless communication terminal 102 and the second wireless communication terminal 104. The TX collision detecting apparatus 500 includes, but is not limited to, a checking circuit 502, a computing circuit 504, and a detecting circuit 506. The checking circuit 502 is arranged for checking packets transmitted from the first wireless communication terminal 102. Specifically, when one retry packet transmitted from the first wireless communication terminal 102 is received by the second wireless communication terminal 104, the checking circuit 502 is arranged for checking if at least one transmission collision condition is met and accordingly generating a checking result CR. The computing circuit 504 is coupled to the checking circuit 502, and arranged for deriving statistic data DS from a plurality of checking results CR generated in response to a plurality of retry packets transmitted from the first wireless communication terminal 102. The detecting circuit 506 is coupled to the computing circuit 504, and arranged for detecting the TX collision between the first wireless communication terminal 102 and the second wireless communication terminal 104 according to the statistic data DS and accordingly generating the detection result DR used for indicating whether the undesired TX collision exists.

Based on actual design requirement/consideration, the checking circuit 502 may employ one or more TX collision conditions for examining each received retry packet (i.e., a packet which has been transmitted by the first wireless communication terminal 102 before, but is not successfully received by the second wireless communication terminal 104). It is possible that the reception failure of the previously transmitted packet results from TX collision. Thus, each TX collision condition employed by the checking circuit 502 is used for detecting any retry packet transmitted possibly due to TX collision. In the following, several exemplary TX collision conditions are detailed.

Figure 6:
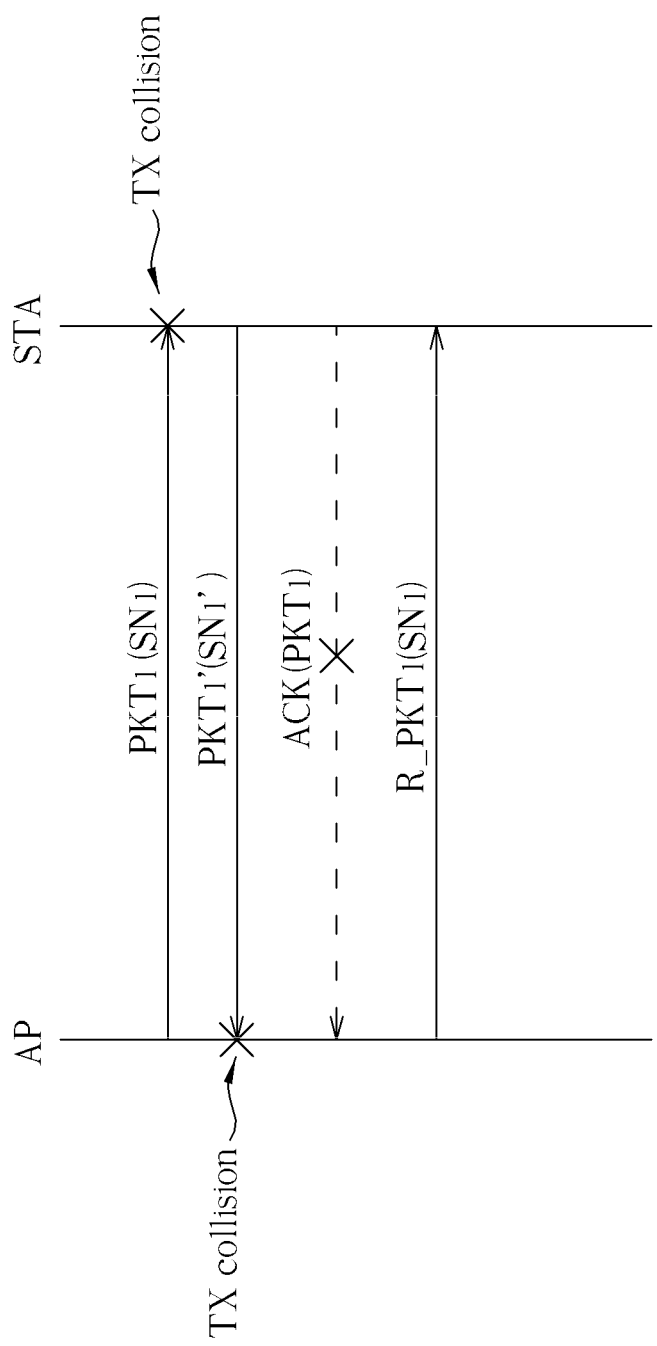
FIG. 6 is a sequence diagram illustrating one packet transmission which satisfies the first transmission collision condition.

A first TX collision condition may be defined to check a sequence number of the received retry packet to see if a packet with the same sequence number is not received by the second wireless communication terminal 104 before. The checking circuit 502 determines that the first TX collision condition is met when the packet with the same sequence number is not received before, and therefore outputs the checking result CR to indicate that the first TX collision condition is met. Otherwise, the checking circuit 502 outputs the checking result CR to indicate that the first TX collision condition is not met. Please refer to FIG. 6, which is a sequence diagram illustrating one packet transmission which satisfies the first TX collision condition. As shown in FIG. 6, the first wireless communication terminal (e.g., AP) 102 transmits a packet $PKT_1$ with a sequence number $SN_1$ to the second wireless communication terminal (e.g., STA) 104 when the second wireless communication terminal 104 transmits a packet $PKT_1'$ with a sequence number $SN_1'$ to the first wireless communication terminal 102. As a real TX collision occurs, the second wireless communication terminal 104 fails to successfully receive the packet $PKT_1$, and does not transmit an acknowledgement message $ACK(PKT_1)$ to inform the first wireless communication terminal 102 of the successful reception of the packet $PKT_1$ having the sequence number $SN_1$. As transmission failure of the packet $PKT_1$ occurs, the first wireless communication terminal 102 has to re-transmit the packet $PKT_1$ with the sequence number $SN_1$. Thus, a retry packet $R\_PKT_1$ with the same sequence number $SN_1$ is transmitted to the second wireless communication terminal 104. When receiving the retry packet $R\_PKT_1$, the checking circuit 502 finds that the packet with the sequence number $SN_1$ is not received before, and therefore determines that the first TX collision condition is met, which implies that the retry packet $R\_PKT_1$ is transmitted by the first wireless communication terminal 102 possibly due to TX collision between the first wireless communication terminal 102 and the second wireless communication terminal 104.

Figure 7:
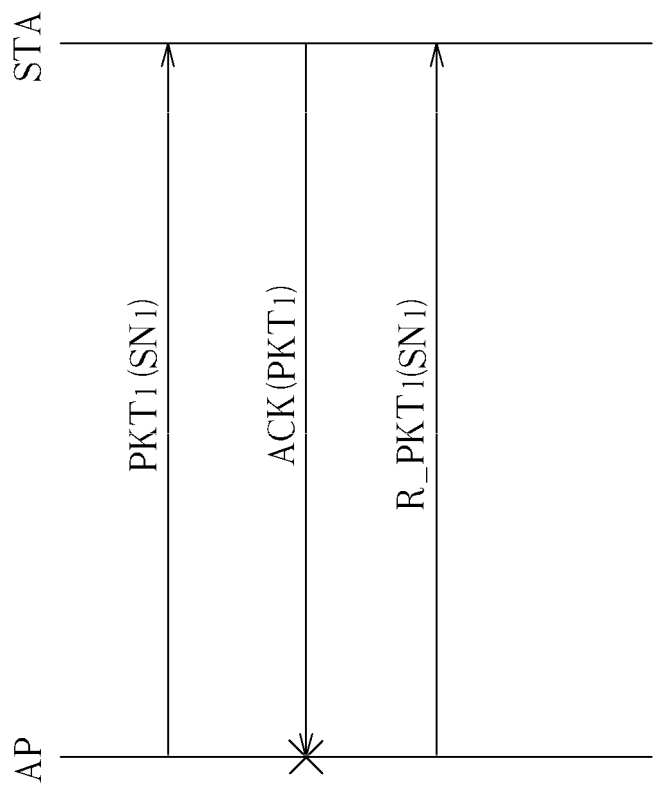
FIG. 7 is a sequence diagram illustrating another packet transmission which does not satisfy the first transmission collision condition.

Please refer to FIG. 7, which is a sequence diagram illustrating another packet transmission which does not satisfy the first TX collision condition. As shown in FIG. 7, the first wireless communication terminal (e.g., AP) 102 transmits a packet $PKT_1$ with the sequence number $SN_1$ to the second wireless communication terminal (e.g., STA) 104 when the second wireless communication terminal 104 is currently operated under the RX mode. Therefore, the second wireless communication terminal 104 successfully receives the packet $PKT_1$, and then transmits an acknowledgement message $ACK(PKT_1)$ to inform the first wireless communication terminal 102 of the successful reception of the packet $PKT_1$ having the sequence number $SN_1$. However, the acknowledgement message $ACK(PKT_1)$ transmitted from the second wireless communication terminal 104 is not successfully received by the first wireless communication terminal 102. Thus, the first wireless communication terminal 102 judges that transmission failure of the packet $PKT_1$ occurs, and re-transmits the packet $PKT_1$ with the sequence number $SN_1$. A retry packet $R\_PKT_1$ with the same sequence number $SN_1$ is therefore transmitted to the second wireless communication terminal 104. When receiving the retry packet $R\_PKT_1$, the checking circuit 502 finds that the packet with the sequence number $SN_1$ is already received before, and therefore determines that the first TX collision condition is not met, which implies that the transmission of the retry packet $R\_PKT_1$ may be irrelevant to TX collision between the first wireless communication terminal 102 and the second wireless communication terminal 104.

Figure 8:
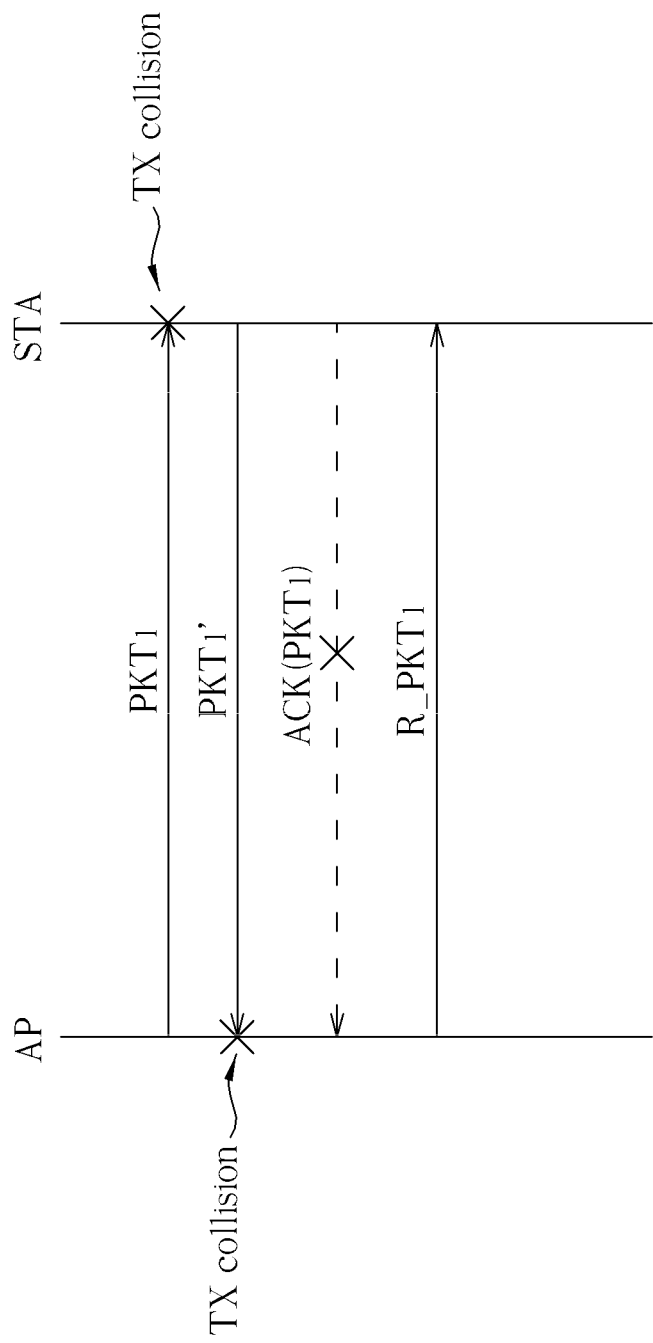
FIG. 8 is a sequence diagram illustrating one packet transmission which satisfies the second transmission collision condition.

A second TX collision condition may be defined to check if a packet transmitted immediately prior to the retry packet transmitted from the first wireless communication terminal 102 is generated from the second wireless communication terminal 104. The checking circuit 502 determines that the second TX collision condition is met when the packet transmitted immediately prior to the retry packet is generated from the second wireless communication terminal, and therefore outputs the checking result CR to indicate that second TX collision condition is met. Otherwise, the checking circuit 502 outputs the checking result CR to indicate that second TX collision condition is not met. Please refer to FIG. 8, which is a sequence diagram illustrating one packet transmission which satisfies the second TX collision condition. As shown in FIG. 8, the first wireless communication terminal (e.g., AP) 102 transmits a packet $PKT_1$ to the second wireless communication terminal (e.g., STA) 104 when the second wireless communication terminal 104 transmits a packet $PKT_1'$ to the first wireless communication terminal 102. As a real TX collision occurs, the second wireless communication terminal 104 fails to successfully receive the packet $PKT_1$, and does not transmit an acknowledgement message $ACK(PKT_1)$ to inform the first wireless communication terminal 102 of the successful reception of the packet $PKT_1$. As the transmission failure of the packet $PKT_1$ occurs, the first wireless communication terminal 102 has to re-transmit the packet $PKT_1$. Thus, a retry packet $R\_PKT_1$ is transmitted to the second wireless communication terminal 104. When receiving the retry packet $R\_PKT_1$, the checking circuit 502 finds that the packet $PKT_1'$ transmitted immediately prior to the retry packet $R\_PKT_1$ is generated from the second wireless communication terminal 104, and therefore determines that the second TX collision condition is met, which implies that the retry packet $R\_PKT_1$ is transmitted by the first wireless communication terminal 102 possibly due to TX collision between the first wireless communication terminal 102 and the second wireless communication terminal 104.

Figure 9:
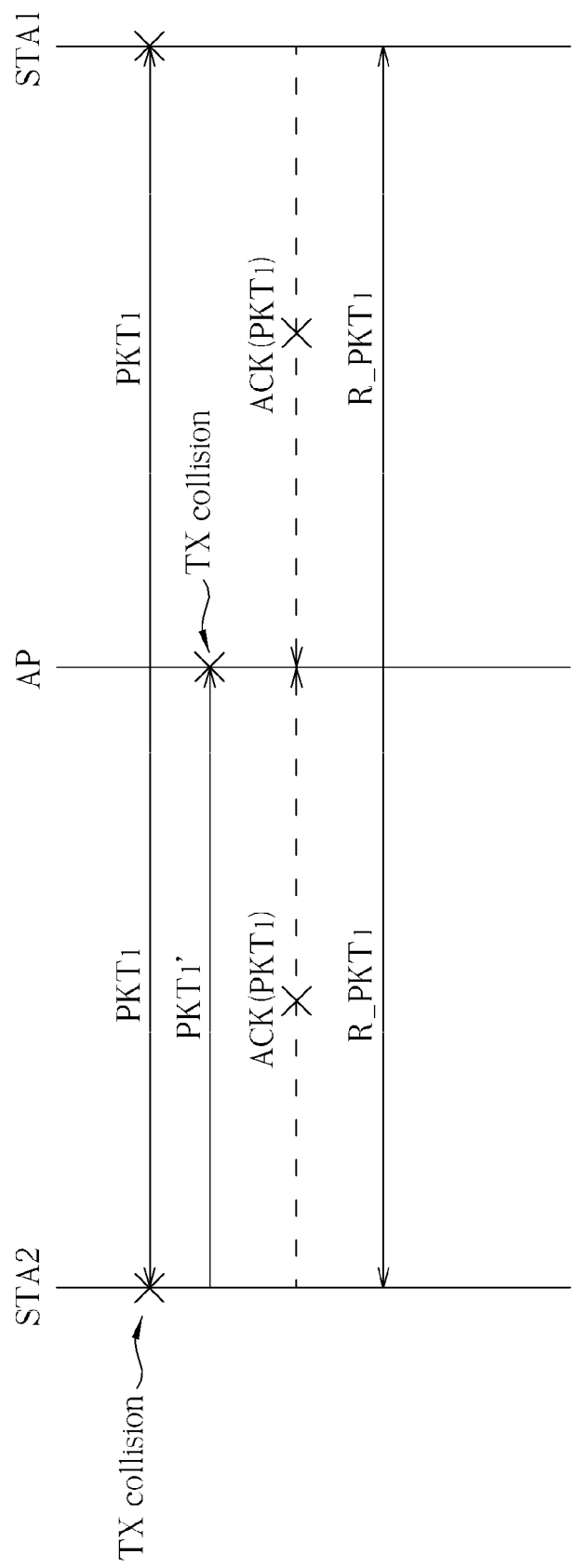
FIG. 9 is a sequence diagram illustrating another packet transmission which does not satisfy the second transmission collision condition.

Please refer to FIG. 9, which is a sequence diagram illustrating another packet transmission which does not satisfy the second TX collision condition. As shown in FIG. 9, the first wireless communication terminal (e.g., AP) 102 transmits a packet $PKT_1$ to the second wireless communication terminal (e.g., STA1) 104 when the second wireless communication terminal (e.g., STA1) 104 is currently operated under the RX mode. However, the second wireless communication terminal 104 fails to successfully receive the packet $PKT_1$, and does not transmit an acknowledgement message $ACK(PKT_1)$ to inform the first wireless communication terminal 102 of the successful reception of the packet $PKT_1$. Therefore, the first wireless communication terminal 102 judges that the transmission failure of the packet $PKT_1$ occurs, and re-transmits the packet $PKT_1$. A retry packet $R\_PKT_1$ is therefore transmitted to the second wireless communication terminal 104. When receiving the retry packet $R\_PKT_1$, the checking circuit 502 finds that the packet $PKT_1$ immediately transmitted prior to the retry packet $R\_PKT1$ is not generated from the second wireless communication terminal 104, and therefore determines that the second TX collision condition is not met, which implies that the transmission of the retry packet $R\_PKT_1$ may be irrelevant to TX collision between the first wireless communication terminal 102 and the second wireless communication terminal 104.

Consider another case where the first wireless communication terminal (e.g., AP) 102 transmits a packet $PKT_1$ to another wireless communication terminal STA2 when the wireless communication terminal STA2 transmits a packet $PKT_1'$ to the first wireless communication terminal 102. As a real TX collision occurs, the wireless communication terminal STA2 fails to successfully receive the packet $PKT_1$, and does not transmit an acknowledgement message $ACK(PKT_1)$ to inform the first wireless communication terminal 102 of the successful reception of the packet $PKT_1$. As the transmission failure of the packet $PKT_1$ occurs, the first wireless communication terminal 102 has to re-transmit the packet $PKT_1$. Thus, in this case, a retry packet $R\_PKT_1$ transmitted from the first wireless communication terminal 102 is also received by the second wireless communication terminal (e.g., STA1) 104 on which the checking circuit 502 is disposed. When receiving the retry packet $R\_PKT_1$, the checking circuit 502 finds that the packet $PKT_1$ immediately transmitted prior to the retry packet $R\_PKT1$ is not generated from the second wireless communication terminal 104, and therefore determines that the second TX collision condition is not met, which implies that the transmission of the retry packet $R\_PKT_1$ may be irrelevant to TX collision between the first wireless communication terminal 102 and the second wireless communication terminal 104.

Figure 10:
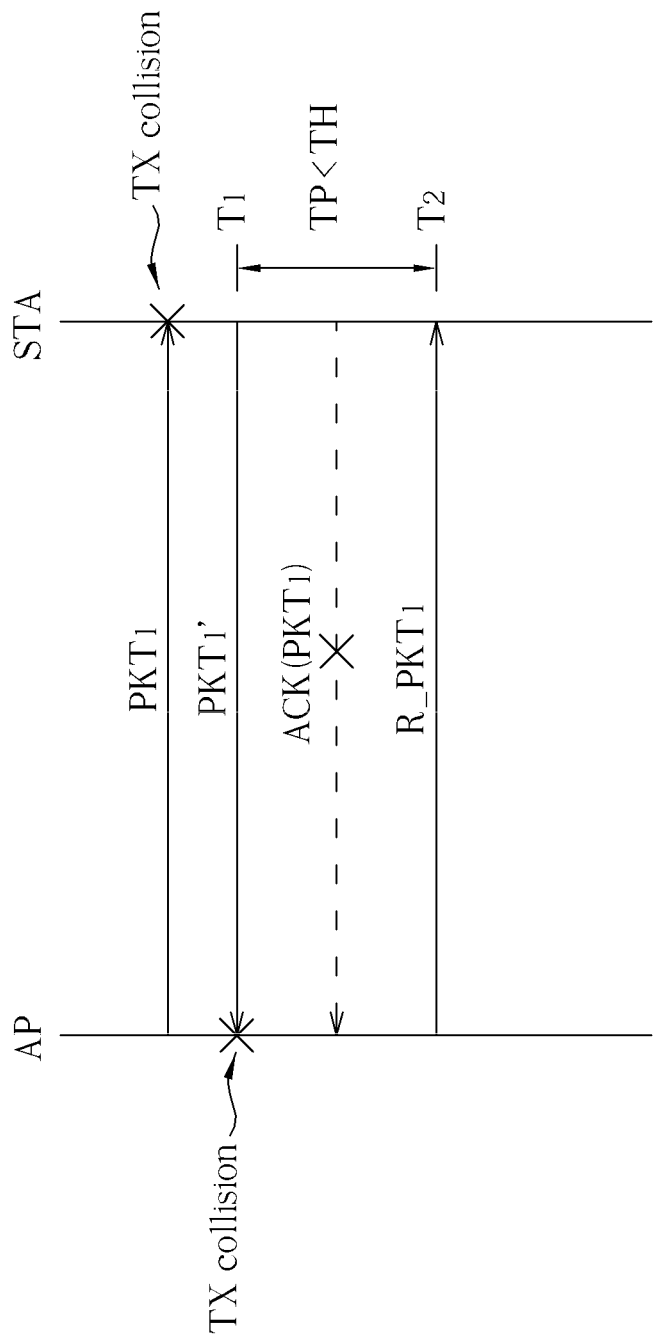
FIG. 10 is a sequence diagram illustrating one packet transmission which satisfies the third transmission collision condition.

A third TX collision condition may be defined to check if a time interval between a time point at which the first wireless communication terminal 102 transmits the retry packet and a time point at which the second wireless communication terminal 104 transmits a packet is shorter than a predetermined threshold TH, wherein the packet is transmitted immediately prior to the retry packet. The checking circuit 502 determines that the third TX collision condition is met when the time interval is found shorter than the predetermined threshold TH, and therefore outputs the checking result CR to indicate that the third TX collision condition is met. Otherwise, the checking circuit 502 outputs the checking result CR to indicate that third TX collision condition is not met. Please refer to FIG. 10, which is a sequence diagram illustrating one packet transmission which satisfies the third TX collision condition. As shown in FIG. 10, the first wireless communication terminal (e.g., AP) 102 transmits a packet $PKT_1$ to the second wireless communication terminal (e.g., STA) 104 when the second wireless communication terminal 104 transmits a packet $PKT_1'$ to the first wireless communication terminal 102. As a real TX collision occurs, the second wireless communication terminal 104 fails to successfully receive the packet $PKT_1$, and does not transmit an acknowledgement message $ACK(PKT_1)$ to inform the first wireless communication terminal 102 of the successful reception of the packet $PKT_1$. As the transmission failure of the packet $PKT_1$ occurs, the first wireless communication terminal 102 has to re-transmit the packet $PKT_1$. Thus, a retry packet $R\_PKT_1$ is therefore transmitted to the second wireless communication terminal 104. As shown in FIG. 10, the packet $PKT_1'$ transmitted immediately prior to the retry packet $R\_PKT_1$ is generated from the second wireless communication terminal 104, and a time interval TP between a time point $T_2$ at which the first wireless communication terminal 102 transmits the retry packet $R\_PKT_1$ and a time point $T_1$ at which the second wireless communication terminal 104 transmits the packet $PKT_1'$ is shorter than the predetermined threshold TH (e.g., 1 ms). Thus, when receiving the retry packet $R\_PKT_1$, the checking circuit 502 determines that the third TX collision condition is met, which implies that the retry packet $R\_PKT_1$ is transmitted by the first wireless communication terminal 102 possibly due to TX collision between the first wireless communication terminal 102 and the second wireless communication terminal 104.

Figure 11:
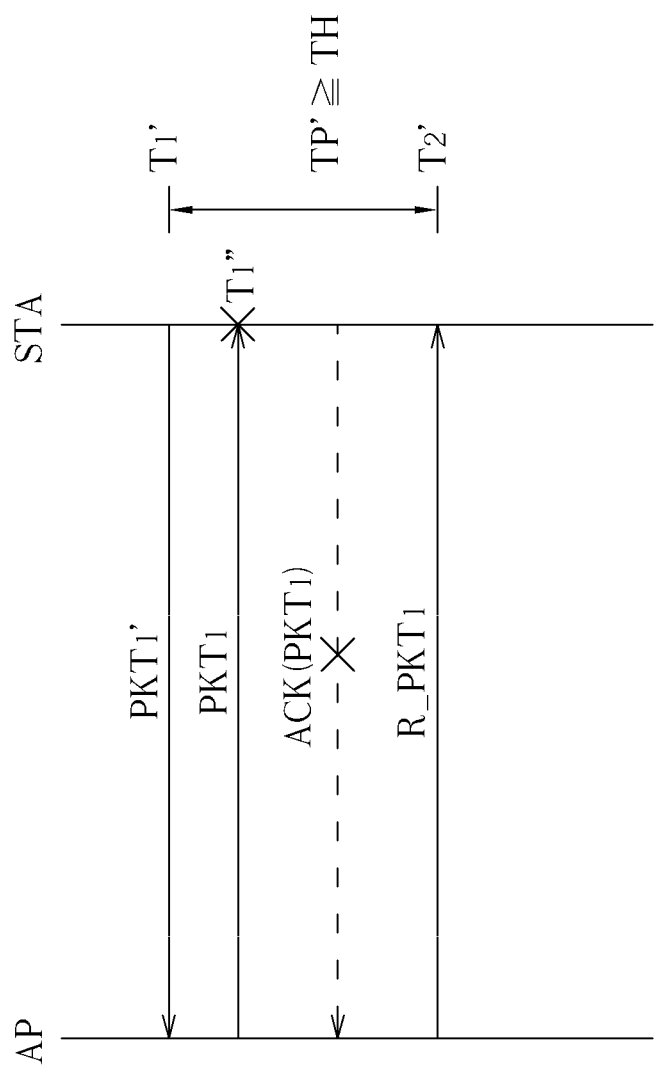
FIG. 11 is a sequence diagram illustrating another packet transmission which does not satisfy the third transmission collision condition.

Please refer to FIG. 11, which is a sequence diagram illustrating another packet transmission which does not satisfy the third TX collision condition. As shown in FIG. 11, the second wireless communication terminal (e.g., STA) 104 transmits a packet $PKT_1'$ to the first wireless communication terminal (e.g., AP) 102 at a time point $T_1'$, wherein the packet $PKT_1'$ will be successfully received by the first wireless communication terminal 102. Next, the first wireless communication terminal 102 transmits a packet $PKT_1$ to the second wireless communication terminal 104 at a time point $T_1''$. However, though there is no TX collision, the packet $PKT_1$ is not successfully received by the second wireless communication terminal 104 due to certain factors. The second wireless communication terminal 104 therefore does not transmit an acknowledgement message $ACK(PKT_1)$ to inform the first wireless communication terminal 102 of the successful reception of the packet $PKT_1$. As the transmission failure of the packet $PKT_1$ occurs, the first wireless communication terminal 102 has to re-transmit the packet $PKT_1$. Thus, a retry packet $R\_PKT_1$ is transmitted to the second wireless communication terminal 104 at a time point $T_2'$. As shown in FIG. 11, the checking circuit 502 of the TX collision detecting apparatus 500 would detect that the packet $PKT_1'$ transmitted immediately prior to the retry packet $R\_PKT_1$ is generated from the second wireless communication terminal 104 (it should be noted that, since the packet $PKT_1$ is not successfully received by the second wireless communication terminal 104, the transmission of the packet $PKT_1$ at the time point $T_1''$ would be invisible to the checking circuit 502), and a time interval TP' between the time point $T_2'$ at which the first wireless communication terminal 102 transmits the retry packet $R\_PKT_1$ and the time point $T_1'$ at which the second wireless communication terminal 104 transmits the packet $PKT_1'$ is not shorter than the predetermined threshold TH (e.g., 1 ms). Thus, when receiving the retry packet $R\_PKT_1$, the checking circuit 502 determines that the third TX collision condition is not met, which implies that the transmission of the retry packet $R\_PKT_1$ may be irrelevant to the TX collision between the first wireless communication terminal 102 and the second wireless communication terminal 104.

In one exemplary design, the checking circuit 502 may employ only one of three TX collision conditions mentioned above or a combination of these three exemplary TX collision conditions to examine each received retry packet. For example, all of the TX collision conditions mentioned above may be employed by the checking circuit 502, and the first TX collision condition, the second TX collision condition, and the third TX collision condition are checked sequentially. Besides, it is determined that there is no possible TX collision when none of the TX collision conditions is met. Please note that this is for illustrative purposes only, and is not meant to be a limitation of the present invention.

Regarding the computing circuit 504, it is implemented for deriving statistic data DS from checking results CR generated in response to retry packets transmitted from the first wireless communication terminal 102. For example, the statistic data DS may include a count value CNT_A indicative of the number of times at least one TX collision condition employed by the checking circuit 502 is met and a count value CNT_B indicative of the number of times none of the at least one TX collision condition employed by the checking circuit 502 is met. Please note that a sum of the count values CNT_A and CNT_B is a count value indicative of the number of received retry packets. The statistic data DS, including the count values CNT_A and CNT_B, is transmitted to the detecting circuit 506 for TX collision detection. In this exemplary embodiment, when the number of received retry packets (i.e., CNT_A+CNT_B) reaches a first predetermined threshold THR_X (e.g., 100), the detecting circuit 506 checks if the number of times the at least one TX collision condition is met (i.e., CNT_A) reaches a second predetermined threshold THR_Y (e.g., 80). When the number of times the at least one TX collision condition is met reaches the second predetermined threshold (i.e., CNT_A≥THR_Y), the checking circuit 506 determines that the TX collision between the first wireless communication terminal 102 and the second wireless communication terminal 104 exists, and therefore generates the detecting result DR to inform the TX timing adjusting apparatus 124 of the occurrence of TX collision.

Figure 12:
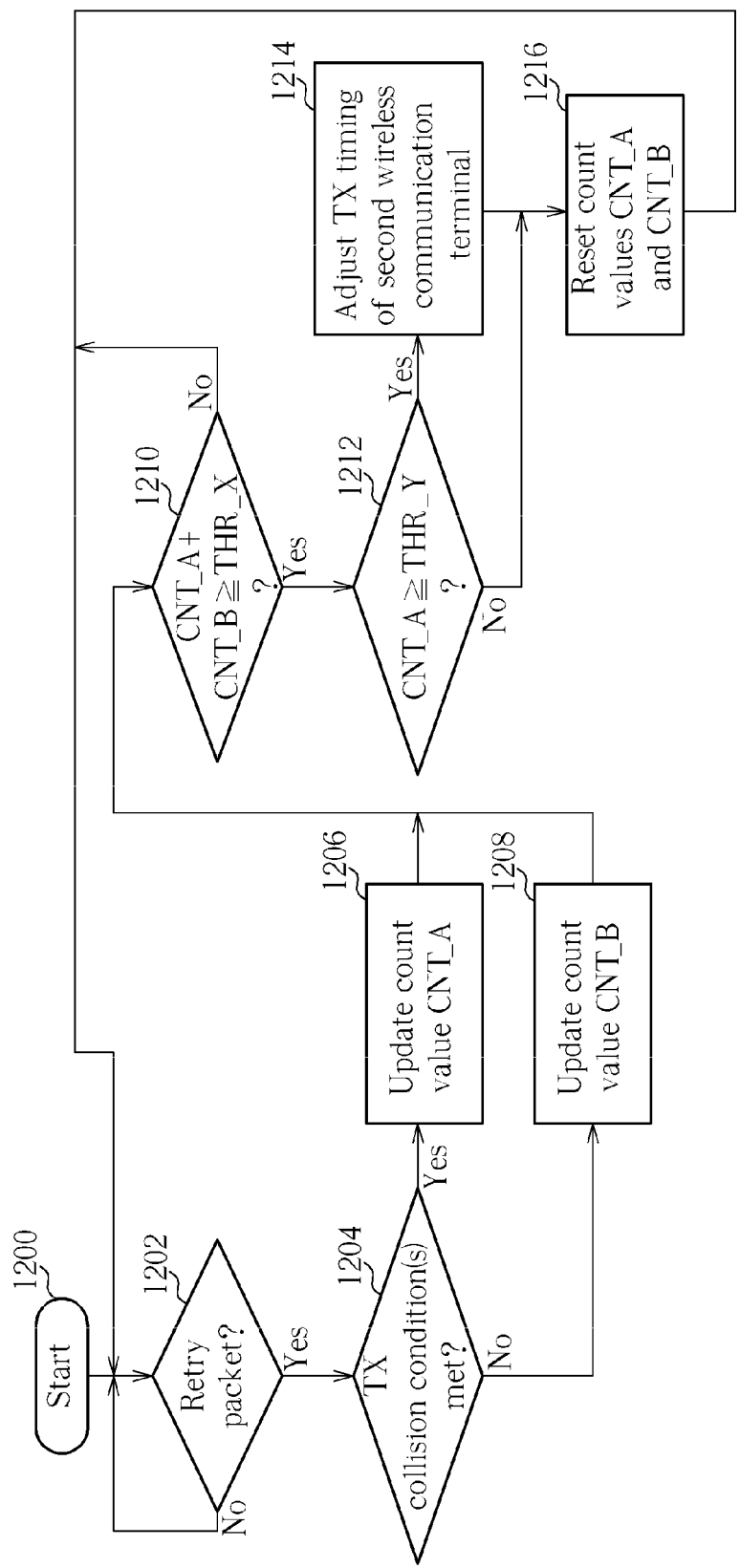
FIG. 12 is a flowchart illustrating a method of alleviating/avoiding TX collision between wireless communication terminals according to a first exemplary embodiment of the present invention.

FIG. 12 is a flowchart illustrating a method of alleviating/avoiding TX collision between wireless communication terminals according to a first exemplary embodiment of the present invention. Provided that the result is substantially the same, the steps are not required to be executed in the exact order shown in FIG. 12. The exemplary method may be employed by the apparatus 112 with the TX collision detecting apparatus 122 realized by the TX collision detecting apparatus shown in FIG. 5, and may be briefly summarized as below.

Step 1200: Start.

Step 1202: Check if a received packet transmitted from the first wireless communication terminal 102 is a retry packet. If yes, go to step 1204; otherwise, proceed with step 1202 to keep monitoring the next packet.

Step 1204: Check if at least one TX collision condition (e.g., the aforementioned first TX collision condition, the aforementioned second TX collision condition, the aforementioned third TX collision condition, or a combination thereof) employed by the checking circuit 502 is met. If yes, go to step 1206; otherwise, go to step 1208. In one exemplary design, the flow may be allowed to proceed with step 1206 when at least one of the TX collision conditions employed by the checking circuit 502 is met. In another exemplary design, the flow may be allowed to proceed with step 1206 when all of the TX collision conditions employed by the checking circuit 502 are met.

Step 1206: Update the count value CNT_A by an adjustment value (e.g., +1). Go to step 1210.

Step 1208: Update the count value CNT_B by an adjustment value (e.g., +1).

Step 1210: Check if a sum of the count values CNT_A and CNT_B reaches a first predetermined threshold THR_X. If yes, go to step 1212; otherwise, go to step 1202 to keep monitoring the next packet.

Step 1212: Check if the count value CNT_A reaches a second predetermined threshold THR_Y. If yes, go to step 1214; otherwise, go to step 1216.

Step 1214: Adjust TX timing of the second wireless communication terminal 104. For example, the TX timing of the second wireless communication terminal 104 may be advanced or delayed, depending upon actual design consideration/requirement.

Step 1216: Reset each of the count values CNT_A and CNT_B to an initial value (e.g., 0). Go to step 1202 to keep monitoring the next packet.

Figure 5:
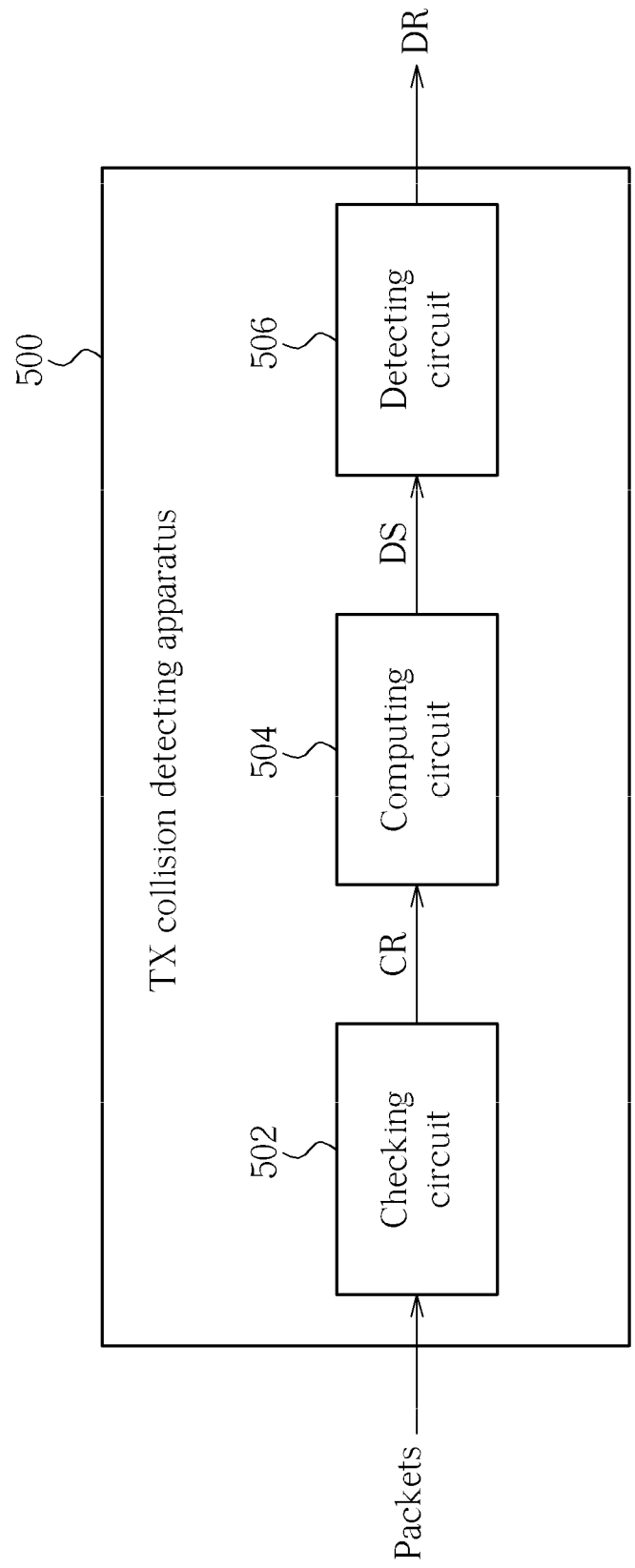
FIG. 5 is a block diagram illustrating one exemplary implementation of a TX collision detecting apparatus according to the present invention.

As a person skilled in the art can readily understand operation of each step shown in FIG. 12 after reading above paragraphs directed to the apparatus 112 shown in FIG. 1 and the TX collision detecting apparatus 500 shown in FIG. 5, further description is omitted here for brevity.

Figure 13:
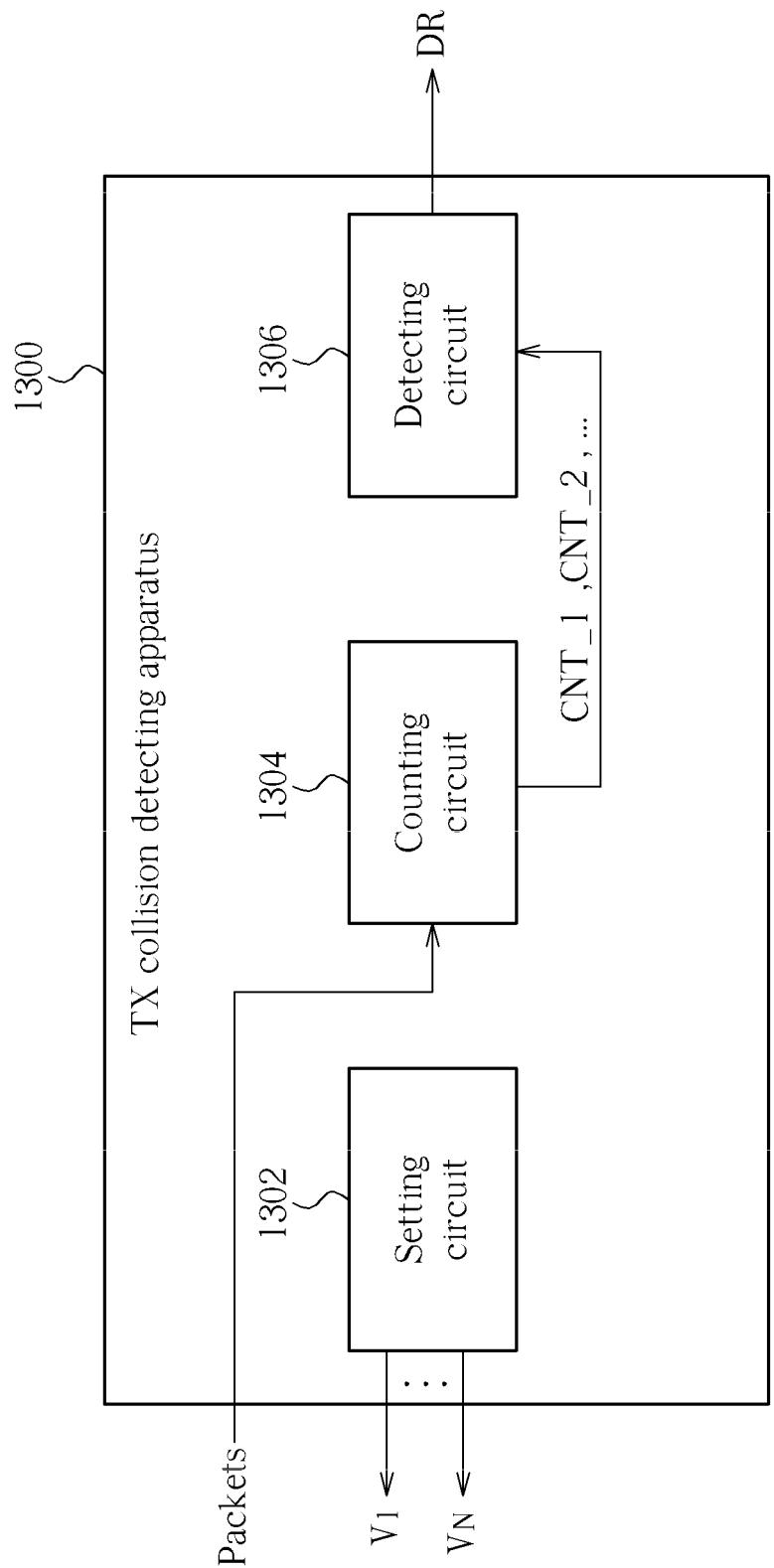
FIG. 13 is a block diagram illustrating another exemplary implementation of a TX collision detecting apparatus according to the present invention.

Please refer to FIG. 13, which is a block diagram illustrating another exemplary implementation of a TX collision detecting apparatus according to the present invention. The TX collision detecting apparatus 122 shown in FIG. 1 may be implemented by the TX collision detecting apparatus 1300 for detecting TX collision between the first wireless communication terminal 102 and the second wireless communication terminal 104. The TX collision detecting apparatus 1300 includes, but is not limited to, a setting circuit 1302, a counting circuit 1304, and a detecting circuit 1306. The setting circuit 1302 is arranged for setting TX timing of the second wireless communication terminal 104 by different values $V_1$-$V_N$. As the TX timing adjusting apparatus 124 also has the capability of adjusting the TX timing of the second wireless communication terminal 104, the setting circuit 1302 shown in FIG. 13 and the TX timing adjusting apparatus 124 shown in FIG. 1 may be implemented using a hardware sharing technique. For example, the setting circuit 1302 may be omitted and the required TX timing adjusting functionality is fully supported by the TX timing adjusting apparatus 124. In other words, the TX timing adjusting apparatus 124 also serves as the setting circuit 1302 used to assign different values $V_1$-$V_N$ to the TX timing of the second wireless communication terminal 104 for TX collision detection. Please note that the number of values $V_1$-$V_N$ may be adjusted according to actual design consideration/requirement. For example, in one exemplary design, the TX timing of the second wireless communication terminal 104 may be configured to be T us, (T−5) us, and (T+5) us, respectively; in another exemplary design, the TX timing of the second wireless communication terminal 104 may be configured to be T us and (T−5) us, respectively; and in yet another exemplary design, the TX timing of the second wireless communication terminal 104 may be configured to be T us and (T+5) us, respectively.

Consider a simple case where the setting circuit 1302 sets TX timing of the second wireless communication terminal 104 by a first value $V_1$ and a second value $V_2$. The counting circuit 1304 is arranged for obtaining a first count value CNT_1 by counting a number of retry packets included in first packets transmitted from the first wireless communication terminal 102 when the TX timing of the second wireless communication terminal is set by the first value $V_1$; and obtaining a second count value CNT_2 by counting a number of retry packets included in second packets transmitted from the first wireless communication terminal 102 when the TX timing of the second wireless communication terminal 104 is set by the second value $V_2$. In one exemplary embodiment, the number of the first packets is equal to the number of the second packets. For example, the counting circuit 1304 may obtain a third count value CNT_1' by counting a number of packets transmitted from the first wireless communication terminal 102 when the TX timing of the second wireless communication terminal is set by the first value $V_1$, wherein all of the first packets are successively received by the second wireless communication terminal 104 when the third count value CNT_1' reaches a predetermined threshold (e.g., THR_X); besides, the counting circuit 1304 may obtain a fourth count value CNT_2' by counting a number of packets transmitted from the first wireless communication terminal 102 TX timing of the second wireless communication terminal is set by the second value $V_2$, wherein all of the second packets are successively received by the second wireless communication terminal 104 when the fourth count value CNT_2' reaches the same predetermined threshold (e.g., THR_X). Please note that the third count value CNT_1' and the fourth count value CNT_2' may be referenced to control counting of the retry packets and adjusting of the TX timing of the second wireless communication terminal 104.

The detecting circuit 1306 is coupled to the counting circuit 1304, and arranged for detecting the TX collision between the first wireless communication terminal 102 and the second wireless communication terminal 104 according to at least the first count value CNT_1 and the second count value CNT_2. In a case where the number of the first packets is equal to the number of the second packets, the count value CNT_1 reflects the retry probability corresponding to the first TX timing setting of the second wireless communication terminal 104, and the count value CNT_2 reflects the retry probability corresponding to the second TX timing setting of the second wireless communication terminal 104. The occurrence probability of TX collision is proportional to the retry probability. Therefore, the detecting circuit 1306 may compare the count values CNT_1 and CNT_2, and refers to a comparison result to identify which TX timing setting makes the second wireless communication terminal 104 significantly suffer from TX collision. More specifically, when the count value CNT_1 is found smaller than the count value CNT_2, the detection result DR generated from the detecting circuit 1306 would indicate that there is probably TX collision between the first wireless communication terminal 102 and the second wireless communication terminal 104 operated under the TX timing set by the second value $V_2$. Thus, after notified by the detecting result DR, the TX timing adjusting apparatus 124 sets the TX timing of the second wireless communication terminal 104 by the smallest tested value (e.g., the first value $V_1$) to alleviate/avoid the undesired TX collision between the first wireless communication terminal 102 and the second wireless communication terminal 104. However, when the count value CNT_2 is found smaller than the count value CNT_1, the detection result DR generated from the detecting circuit 1306 would indicate that there is probably TX collision between the first wireless communication terminal 102 and the second wireless communication terminal 104 operated under the TX timing set by the first value $V_1$. Thus, after notified by the detecting result DR, the TX timing adjusting apparatus 124 sets the TX timing of the second wireless communication terminal 104 by the smallest tested value (i.e., the second value $V_2$) to alleviate/avoid the undesired TX collision between the first wireless communication terminal 102 and the second wireless communication terminal 104.

In above exemplary design, only two values $V_1$ and $V_2$ are used to set the TX timing of the second wireless communication terminal 104 for retry probability estimation. However, this is for illustrative purposes only, and is not meant to be a limitation of the present invention. That is, using more than two values to set the TX timing of the second wireless communication terminal 104 for retry probability estimation is feasible.

Figure 14:
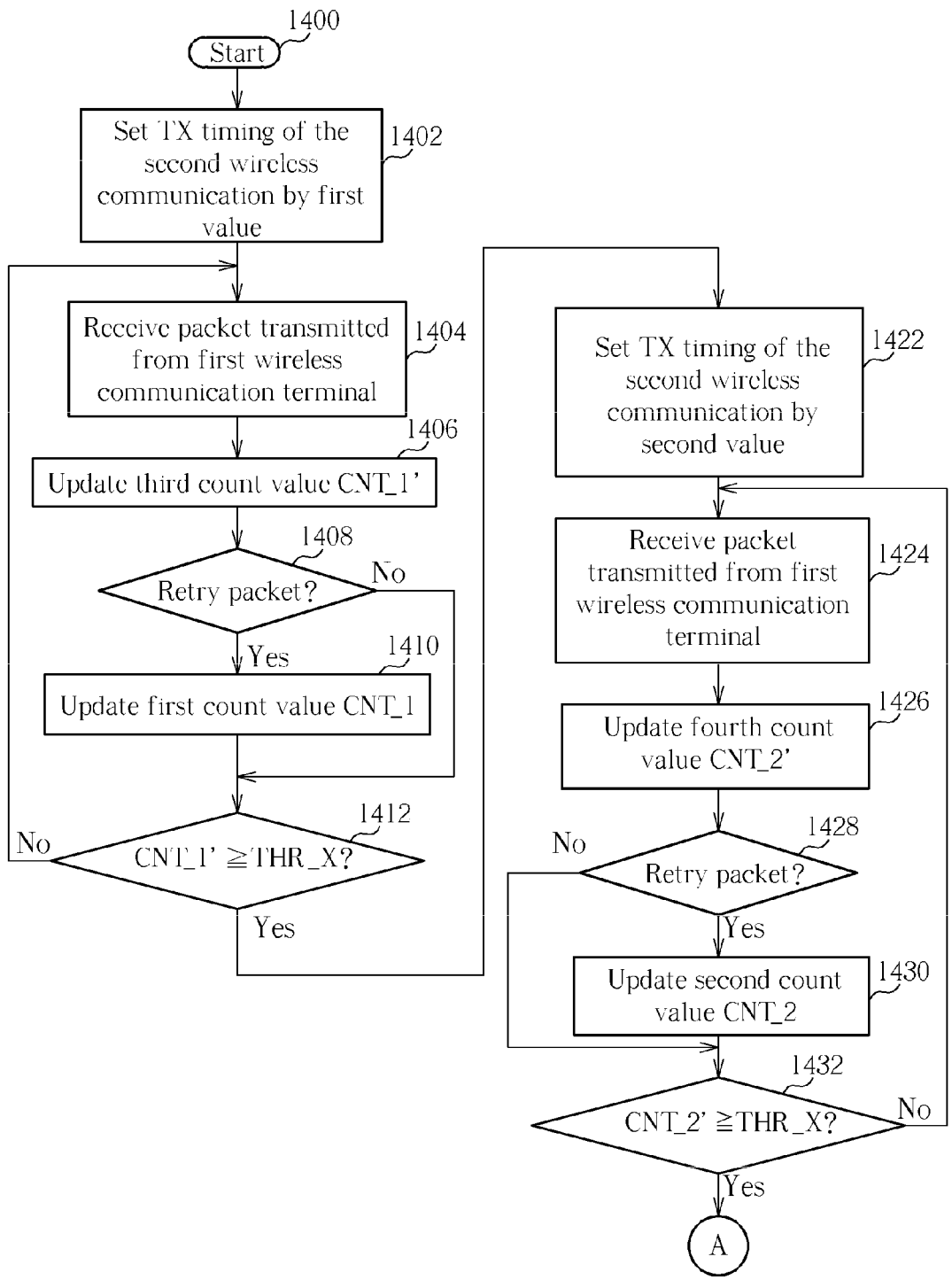
FIG. 14 is a flowchart illustrating a method of alleviating/avoiding TX collision between wireless communication terminals according to a second exemplary embodiment of the present invention.
Figure 15:
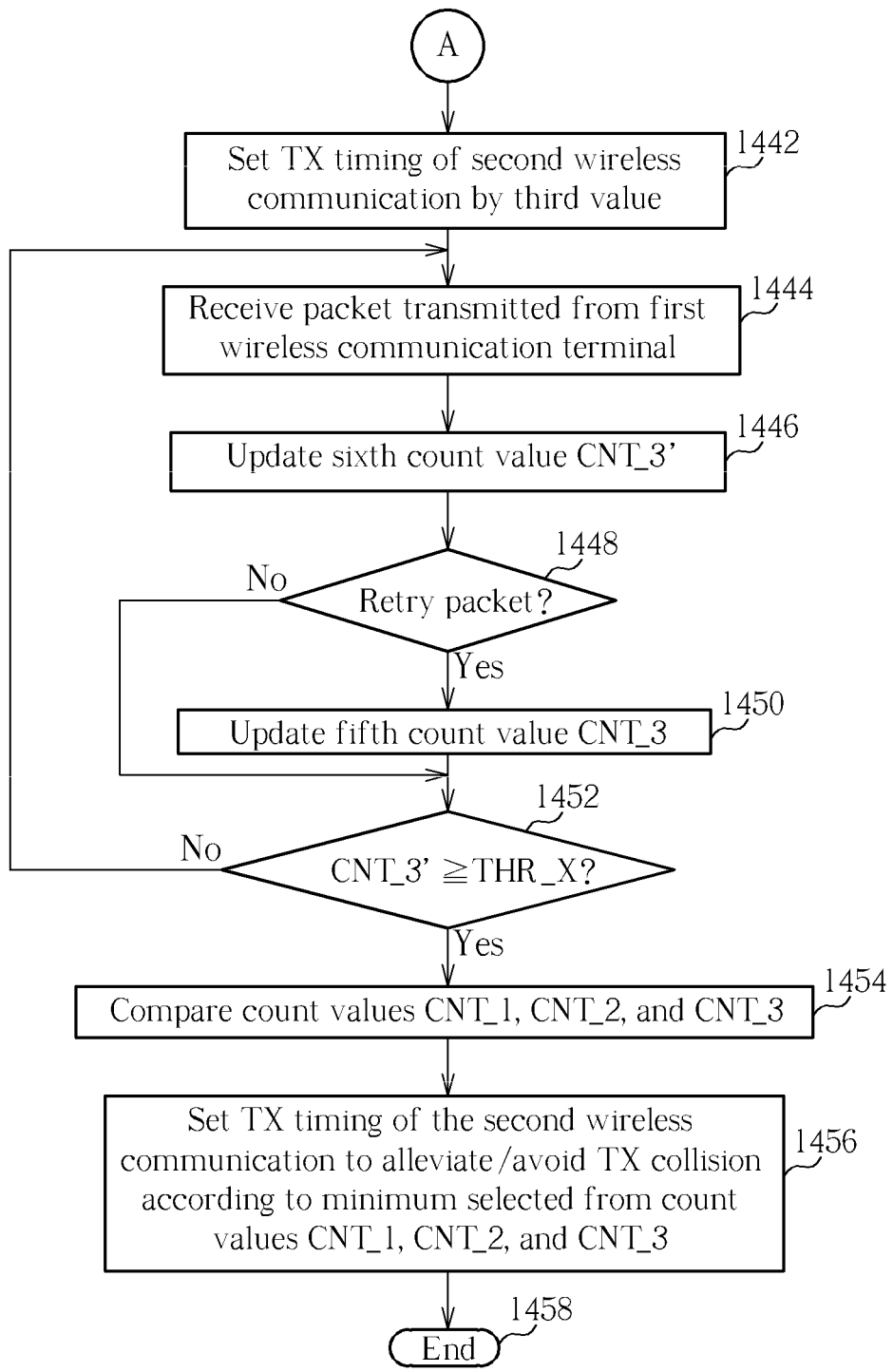
FIG. 15 shows a continued flow of FIG. 14.

Please refer to FIG. 14 and FIG. 15. FIG. 14 is a flowchart illustrating a method of alleviating/avoiding TX collision between wireless communication terminals according to a second exemplary embodiment of the present invention. FIG. 15 shows a continued flow of FIG. 14. Provided that the result is substantially the same, the steps are not required to be executed in the exact order shown in FIG. 14 and FIG. 15. The exemplary method may be employed by the apparatus 112 with the TX collision detecting apparatus 122 realized by the TX collision detecting apparatus shown in FIG. 13, and may be briefly summarized as below.

Step 1400: Start.

Step 1402: Set the TX timing of the second wireless communication 104 by a first value.

Step 1404: Receive a packet transmitted from the first wireless communication terminal 102.

Step 1406: Update a third count value CNT_1' by an adjustment value (e.g., +1).

Step 1408: Check if the received packet is a retry packet. If yes, go to step 1410; otherwise, go to step 1412.

Step 1410: Update a first count value CNT_1 by an adjustment value (e.g., +1).

Step 1412: Check if the third count value CNT_1' reaches a predetermined threshold THR_X. If yes, go to step 1422; otherwise, go to step 1404 to keep processing the next packet.

Step 1422: Set the TX timing of the second wireless communication 104 by a second value.

Step 1424: Receive a packet transmitted from the first wireless communication terminal 102.

Step 1426: Update a fourth count value CNT_2' by an adjustment value (e.g., +1).

Step 1428: Check if the received packet is a retry packet. If yes, go to step 1430; otherwise, go to step 1432.

Step 1430: Update a second count value CNT_2 by an adjustment value (e.g., +1).

Step 1432: Check if the fourth count value CNT_2' reaches the predetermined threshold THR_X. If yes, go to step 1442; otherwise, go to step 1424 to keep processing the next packet.

Step 1442: Set the TX timing of the second wireless communication 104 by a third value.

Step 1444: Receive a packet transmitted from the first wireless communication terminal 102.

Step 1446: Update a sixth count value CNT_3' by an adjustment value (e.g., +1).

Step 1448: Check if the received packet is a retry packet. If yes, go to step 1450; otherwise, go to step 1452.

Step 1450: Update a fifth count value CNT_3 by an adjustment value (e.g., +1).

Step 1452: Check if the sixth count value CNT_3' reaches the predetermined threshold THR_X. If yes, go to step 1454; otherwise, go to step 1444 to keep processing the next packet.

Step 1454: Compare the count values CNT_1, CNT_2, and CNT_3.

Step 1456: Set the TX timing of the second wireless communication 104 to alleviate/avoid TX collision according to a minimum selected from the count values CNT_1, CNT_2, and CNT_3.

Step 1458: End.

As a person skilled in the art can readily understand operation of each step shown in FIG. 14 and FIG. 15 after reading above paragraphs directed to the apparatus 112 shown in FIG. 1 and the TX collision detecting apparatus 1300 shown in FIG. 13, further description is omitted here for brevity.

In above example, the same predetermined threshold THR_X is used for monitoring the number of packets received by the second wireless communication terminal 104 operated under different TX timing settings. However, this is for illustrative purposes only, and is not meant to be a limitation of the present invention. In an alternative design, the predetermined thresholds used in steps 1412, 1432, and 1452 may be different. Suppose that different predetermined thresholds used in steps 1412, 1432, and 1452 are THR_X, THR_X', and THR_X", respectively. Thus, CNT_1/THR_X reflects the retry probability corresponding to the TX timing set by the first value, CNT_2/THR_X' reflects the retry probability corresponding to the TX timing set by the second value, and CNT_3/THR_X" reflects the retry probability corresponding to the TX timing set by the third value. With a properly modification made to steps 1454 and 1456, the TX timing adjusting apparatus 124 is still capable of properly setting the TX timing of the second wireless communication 104 to alleviate/avoid TX collision according to a minimum selected from retry probability values CNT_1/THR_X, CNT_2/THR_X', and CNT_3/THR_X".

Moreover, in above exemplary embodiments, the first wireless communication terminal 102 may be an AP of a WiFi system, and the second wireless communication terminal 104 may be an STA of a WiFi system. However, in an alternative design, the first wireless communication terminal 102 may be an STA of a WiFi system, and the second wireless communication terminal 104 may be an AP of a WiFi system. The same objective of alleviating/avoiding TX collision between two wireless communication terminals is achieved. It should be noted that the use of the proposed mechanism for dealing with TX collision is not limited to a WiFi application. Any half-duplex communication system employing the proposed mechanism falls within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for detecting a transmission collision between a first wireless communication terminal and a second wireless communication terminal, comprising:
    when one retry packet transmitted from the first wireless communication terminal is received by the second wireless communication terminal, checking if at least one transmission collision condition is met and accordingly generating a checking result;
    deriving statistic data from a plurality of checking results generated in response to a plurality of retry packets transmitted from the first wireless communication terminal; and
    detecting the transmission collision between the first wireless communication terminal and the second wireless communication terminal according to the statistic data.

2. The method of claim 1, wherein the step of checking if the at least one transmission collision condition is met comprises:
    checking a sequence number of the received retry packet to see if a packet with the sequence number is not received before; and
    determining that a transmission collision condition is met when the packet with the sequence number is not received before.

3. The method of claim 1, wherein the step of checking if the at least one transmission collision condition is met comprises:
    checking if a packet transmitted immediately prior to the retry packet transmitted from the first wireless communication terminal is generated from the second wireless communication terminal; and
    determining that a transmission collision condition is met when the packet transmitted immediately prior to the retry packet is generated from the second wireless communication terminal.

4. The method of claim 1, wherein the step of checking if the at least one transmission collision condition is met comprises:
    checking if a time interval between a time point at which the first wireless communication terminal transmits the retry packet and a time point at which the second wireless communication terminal transmits a packet is shorter than a predetermined threshold, wherein the packet is transmitted immediately prior to the retry packet; and
    determining that a transmission collision condition is met when the time interval is shorter than the predetermined threshold.

5. The method of claim 1, wherein the step of detecting the transmission collision between the first wireless communication terminal and the second wireless communication terminal comprises:
    when a number of received retry packets reaches a first predetermined threshold, checking if a number of times the at least one transmission collision condition is met reaches a second predetermined threshold; and
    when the number of times the at least one transmission collision condition is met reaches the second predetermined threshold, determining that the transmission collision between the first wireless communication terminal and the second wireless communication terminal exists.

6. A method for detecting a transmission collision between a first wireless communication terminal and a second wireless communication terminal, comprising:
    setting transmission timing of the second wireless communication terminal by different values including at least a first value and a second value;
    when the transmission timing of the second wireless communication terminal is set by the first value, obtaining a first count value by counting a number of retry packets included in first packets transmitted from the first wireless communication terminal;
    when the transmission timing of the second wireless communication terminal is set by the second value, obtaining a second count value by counting a number of retry packets included in second packets transmitted from the first wireless communication terminal; and
    detecting the transmission collision between the first wireless communication terminal and the second wireless communication terminal according to at least the first count value and the second count value.

7. The method of claim 6, wherein a number of the first packets is equal to a number of the second packets.

8. A method for alleviating a transmission collision between a first wireless communication terminal and a second wireless communication terminal, comprising:
    detecting the transmission collision between the first wireless communication terminal and the second wireless communication terminal by checking if at least one transmission collision condition is met, and accordingly generating a detection result, wherein checking if the at least one transmission collision condition is met comprises:
        checking if a time interval between a time point at which the first wireless communication terminal transmits a retry packet and a time point at which the second wireless communication terminal transmits a packet is shorter than a predetermined threshold, wherein the packet is transmitted immediately prior to the retry packet; and
        determining that a transmission collision condition is met when the time interval is shorter than the predetermined threshold; and
    adjusting transmission timing of the second wireless communication terminal according to the detection result by advancing the transmission timing of the second wireless communication terminal or by delaying the transmission timing of the second wireless communication terminal.

9. The method of claim 8, wherein checking if the at least one transmission collision condition is met comprises:
    checking a sequence number of the received retry packet to see if a packet with the sequence number is not received before; and
    determining that a transmission collision condition is met when the packet with the sequence number is not received before.

10. The method of claim 8, wherein checking if the at least one transmission collision condition is met comprises:
    checking if a packet transmitted immediately prior to the retry packet transmitted from the first wireless communication terminal is generated from the second wireless communication terminal; and
    determining that a transmission collision condition is met when the packet transmitted immediately prior to the retry packet is generated from the second wireless communication terminal.

11. A transmission collision detecting apparatus for detecting a transmission collision between a first wireless communication terminal and a second wireless communication terminal, comprising:
    a checking circuit, arranged for checking if at least one transmission collision condition is met and accordingly generating a checking result when one retry packet transmitted from the first wireless communication terminal is received by the second wireless communication terminal;

a computing circuit, coupled to the checking circuit and arranged for deriving statistic data from a plurality of checking results generated in response to a plurality of retry packets transmitted from the first wireless communication terminal; and a detecting circuit, coupled to the computing circuit and arranged for detecting the transmission collision between the first wireless communication terminal and the second wireless communication terminal according to the statistic data.

12. The transmission collision detecting apparatus of claim 11, wherein the checking circuit is arranged for checking if the at least one transmission collision condition is met by:

checking a sequence number of the received retry packet to see if a packet with the sequence number is not received before; and determining that a transmission collision condition is met when the packet with the sequence number is not received before.

13. The transmission collision detecting apparatus of claim 11, wherein the checking circuit is arranged for checking if the at least one transmission collision condition is met by:

checking if a packet transmitted immediately prior to the retry packet transmitted from the first wireless communication terminal is generated from the second wireless communication terminal; and determining that a transmission collision condition is met when the packet transmitted immediately prior to the retry packet is generated from the second wireless communication terminal.

14. The transmission collision detecting apparatus of claim 11, wherein the checking circuit is arranged for checking if the at least one transmission collision condition is met by:

checking if a time interval between a time point at which the first wireless communication terminal transmits the retry packet and a time point at which the second wireless communication terminal transmits a packet is shorter than a predetermined threshold, wherein the packet is transmitted immediately prior to the retry packet; and determining that a transmission collision condition is met when the time interval is shorter than the predetermined threshold.

15. The transmission collision detecting apparatus of claim 11, wherein the detecting circuit is arranged for checking if a number of times the at least one transmission collision condition is met reaches a second predetermined threshold when a number of received retry packets reaches a first predetermined threshold; and determining that the transmission collision between the first wireless communication terminal and the second wireless communication terminal exists when the number of times the at least one transmission collision condition is met reaches the second predetermined threshold.

16. A transmission collision detecting apparatus for detecting a transmission collision between a first wireless communication terminal and a second wireless communication terminal, comprising:

a setting circuit, arranged for setting transmission timing of the second wireless communication terminal by different values including at least a first value and a second value;

a counting circuit, arranged for obtaining a first count value by counting a number of retry packets included in first packets transmitted from the first wireless communication terminal when the transmission timing of the second wireless communication terminal is set by the first value; and obtaining a second count value by counting a number of retry packets included in second packets transmitted from the first wireless communication terminal when the transmission timing of the second wireless communication terminal is set by the second value; and a detecting circuit, coupled to the counting circuit and arranged for detecting the transmission collision between the first wireless communication terminal and the second wireless communication terminal according to at least the first count value and the second count value.

17. The transmission collision detecting apparatus of claim 16, wherein a number of the first packets is equal to a number of the second packets.

18. An apparatus for alleviating a transmission collision between a first wireless communication terminal and a second wireless communication terminal, comprising:

a transmission collision detecting apparatus, arranged for detecting the transmission collision between the first wireless communication terminal and the second wireless communication terminal by checking if at least one transmission collision condition is met, and accordingly generating a detection result, wherein the transmission collision detecting apparatus is arranged for checking if the at least one transmission collision condition is met by:

checking if a time interval between a time point at which the first wireless communication terminal transmits a retry packet and a time point at which the second wireless communication terminal transmits a packet is shorter than a predetermined threshold, wherein the packet is transmitted immediately prior to the retry packet; and determining that a transmission collision condition is met when the time interval is shorter than the predetermined threshold; and a transmission timing adjusting apparatus, coupled to the transmission collision detecting apparatus and arranged for adjusting transmission timing of the second wireless communication terminal according to the detection result by advancing the transmission timing of the second wireless communication terminal or by delaying the transmission timing of the second wireless communication terminal.

19. The apparatus of claim 18, wherein the transmission collision detecting apparatus is arranged for checking if the at least one transmission collision condition is met by:

checking a sequence number of the received retry packet to see if a packet with the sequence number is not received before; and determining that a transmission collision condition is met when the packet with the sequence number is not received before.

20. The apparatus of claim 18, wherein the transmission collision detecting apparatus is arranged for checking if the at least one transmission collision condition is met by:

checking if a packet transmitted immediately prior to the retry packet transmitted from the first wireless communication terminal is generated from the second wireless communication terminal; and determining that a transmission collision condition is met when the packet transmitted immediately prior to the retry packet is generated from the second wireless communication terminal.

* * * * *